United States Patent [19]

Shimizu et al.

[11] Patent Number: 5,494,752
[45] Date of Patent: Feb. 27, 1996

[54] COMPOSITE MICROPARTICLE OF FLUORINE CONTAINING RESINS

[75] Inventors: Tetsuo Shimizu; Seitaro Yamaguchi; Yoshihisa Yamamoto, all of Osaka, Japan

[73] Assignee: Daikin Industries, Ltd., Osaka, Japan

[21] Appl. No.: 193,062

[22] PCT Filed: Jul. 9, 1993

[86] PCT No.: PCT/JP93/00950

§ 371 Date: Mar. 8, 1994

§ 102(e) Date: Mar. 8, 1994

[87] PCT Pub. No.: WO94/01475

PCT Pub. Date: Jan. 20, 1994

[30] Foreign Application Priority Data

Jul. 9, 1992 [JP] Japan .................................. 4-182203
Apr. 1, 1993 [JP] Japan .................................. 5-075653

[51] Int. Cl.[6] ........................ B32B 5/16; C08L 83/00
[52] U.S. Cl. ..................... 428/407; 428/421; 428/422; 523/201; 525/276; 525/902
[58] Field of Search .......................... 428/403, 407, 428/421, 422; 525/72, 276, 902; 523/201

[56] References Cited

U.S. PATENT DOCUMENTS

| | | | |
|---|---|---|---|
| 3,692,759 | 9/1972 | Ocone | 528/481 |
| 4,076,929 | 2/1978 | Dohany | 526/255 |
| 4,469,846 | 9/1984 | Khan et al. | 525/72 |
| 4,780,490 | 10/1988 | Mizuno et al. | 523/201 |
| 4,840,998 | 6/1989 | Shimizu et al. | 525/276 |
| 4,879,362 | 11/1989 | Morgan | 526/247 |
| 4,904,726 | 2/1990 | Morgan et al. | 524/520 |
| 4,908,410 | 3/1990 | Malhotra | 525/276 |
| 4,946,900 | 8/1990 | Blaise et al. | 525/276 |
| 4,952,630 | 8/1990 | Morgan et al. | 525/72 |
| 4,952,636 | 8/1990 | Morgan et al. | 525/276 |
| 5,030,667 | 7/1991 | Shimizu et al. | 523/201 |
| 5,118,788 | 6/1992 | Hosokawa et al. | 528/503 |
| 5,188,764 | 2/1993 | Shimizu et al. | 252/308 |
| 5,296,165 | 3/1994 | Shimizu et al. | 252/311 |

FOREIGN PATENT DOCUMENTS

63-284201 11/1988 Japan.

*Primary Examiner*—D. S. Nakarani
*Assistant Examiner*—H. Thi Le
*Attorney, Agent, or Firm*—Birch, Stewart, Kolasch & Birch

[57] ABSTRACT

A composite microparticle of fluorine containing resin which is obtained by emulsion polymerization, having a core portion of a perfluoro resin which contains 80 to 100% by weight of TFE and 0 to 15% by weight of other copolymerizable fluorine containing olefin in a monomer composition, is crystalline and has a melting point of not lower than 250 C.; and a shell portion of vinylidene fluoride resin which contains 30 to 100 mole % of vinylidene fluoride and 0 to 70 mole % of other copolymerizable fluorine containing olefin (excluding hexafluoroisobutene), is crystalline and has a melting point of not lower than 70° C.; the composite particle having a multilayer or gradient structure and an averaged particle size of 0.05 to 1.0 μm, which is excellent in blending property with other resins or elastomers, and dispersibility in coating materials.

25 Claims, 1 Drawing Sheet

COMPOSITE MICROPARTICLE OF FLUORINE CONTAINING RESINS

FIELD OF THE INVENTION

The present invention relates to a composite microparticle of fluorine containing resins. More particularly, the present invention relates to a composite microparticle of fluorine containing resins having a multilayer or gradient structure which is excellent in blending property with synthetic resins, synthetic rubbers or coating materials, and dispersibility therein.

DESCRIPTION OF THE PRIOR ART

Perfluororesins such as polytetrafluoroethylene (referred to as "PTFE" hereinafter), tetrafluoroethylene (TFE)/perfluoro (alkyl vinyl ether) copolymer (referred to as "PFA" hereinafter), TFE/hexafluoropropylene (HFP) copolymer (referred to as "FEP" hereinafter) are usually commercially available in the form of microparticles, powder, pellets, etc. They are used in various fields as a molding raw material for a molded product which has excellent performance and function characteristics such as high and low temperature resistance, flame retardance, slidability, nontackiness, stain resistance, chemical resistance, weathering resistance and electrical characteristics, etc. They are also used as a modifying agent by dispersing in or blending with other materials. Perfluororesins are used in the form of powder or pellet for blending with a structural material such as a synthetic resin or synthetic rubber, and in the form of microparticles or powder for dispersing in a liquid or semisolid material such as a coating material, paint, oil, grease, ink and the like.

In the case of PTFE which is a typical perfluororesin, the microparticles are prepared by so-called emulsion polymerization in the presence of a surfactant in an aqueous medium and obtained in a colloidal form having an average particle size of from 0.05 to 1.0 μm in an aqueous dispersion (latex).

Powdery PTFE includes aggregated powder of PTFE microparticles (fine powder) having an average particle size of from 100 to 1000 μm which is prepared by aggregating and drying the above aqueous dispersion, and a granular particle (granular or molding powder) which is prepared by so-called suspension polymerization in the presence or absence of a small amount of a surfactant. They are used as molding powder in many fields. The PTFE powder of the type once subjected to heat-treatment at a temperature above the melting point of PTFE is also commercially available.

The fine powder or molding powder as a raw material for molding has a considerably high molecular weight and a melt viscosity of $10^8$ poise or more at 380° C., hence having no melt processability. Therefore, they are seldom used as a modifying agent for other material by dispersing in or blending with it except in special cases. The main reason why the powder is unsuitable for dispersing or blending is that they undergo fibrillation during the dispersing or the blending procedure. Accordingly, the microparticle or powder of a low molecular weight PTFE, which is emulsion or suspension polymerized under such a condition that a low molecular weight PTFE can be obtained, is commercially available hitherto for dispersing or blending. The fibrillation characteristics of PTFE depends generally on its molecular weight and blending conditions. When the molecular weight of PTFE is below a certain level, the fibrillation characteristics is lost On the other hand, when a high molecular weight PTFE is once subjected to heat-treatment (usually at a temperature above the melting point of the PTFE), it almost loses the fibrillation characteristics below the melting point. This is considered to be because the crystalline form of PTFE before the heat-treatment (virgin PTFE) is considerably different from that after the heat-treatment (sintered PTFE). However, when the high molecular weight PTFE which is once subjected to the heat treatment is blended with other material at a temperature above the melting point, it is also fibrillated during the melting and kneading procedure of the blend. Generally speaking, a polymer material has more preferred mechanical properties when it has higher molecular weight. For the improvement of slidability which is a main purpose of the use of the microparticle or the powder of PTFE, it is considered that better abrasive resistance can be achieved for higher molecular weight PTFE. Accordingly, the microparticle or powder of PTFE which is difficult to be fibrillated and has a high molecular weight is desired.

Another problem of PTFE used for blending or dispersing is that it has a low surface energy and hence very little affinity to other materials usually used. Other perfluororesins such as PFA and FEP also have similar properties. When the microparticle or powder of PFA or FEP obtained by emulsion or suspension polymerization, or the pellet obtained by once melting and extruding them is dispersed in or blended with other material, PFA or FEP is not fibrillated. However, they essentially have no surface adhesive force to other materials. Thus separation of the perfluororesin portion from the other material portion is liable to occur at an interface between them. In addition, the perfluororesin to be dispersed is aggregated in the other material, showing poor dispersibility therein. As a result, the perfluororesin cannot develop its abilities.

To solve the above-mentioned problems, there are suggested some microparticles having a core/shell structure. Many of the suggestions are concerned with PTFE, in which the surface of PTFE microparticle is covered with another resin which does not show the fibrillation characteristics and has higher surface energy than PTFE.

Japanese Patent Kokoku Publication No. 63584/1988 discloses a composite microparticle of fluorine containing resins which is composed of a core portion of PTFE and a shell portion of TFE/chlorotrifluoroethylene (referred to as "CTFE" hereinafter) copolymer which is excellent in dispersibility in a coating material. Japanese Patent Kokai Publication No. 284201/1988 discloses that a composite microparticle a shell portion of which is composed of an acrylic polymer is excellent in dispersibility in a coating material. Japanese Patent Kokai Publication No.158651/1990 discloses that a microparticle a shell portion of which consists of ethylene/TFE copolymer is excellent in dispersibility in resin or coating composition. Japanese Patent Kokai Publication No. 247408/1989 discloses that, on the same idea with Japanese Patent Kokoku Publication No. 63584/1988, the copolymerization with HFP, perfluorobuthylethylene, perfluoromethyl vinyl ether, or perfluoropropyl vinyl ether in modifying amounts suppresses the fibrillation in the shell portion to provide a powder suitable for blending with resins and rubbers. Japanese Patent Kokai Publication No. 232109/1984 discloses a microparticle comprising a core portion of PTFE and a shell portion of fluorine containing rubber which is suitable for blending with rubbers.

According to our investigations, the conventional microparticles mentioned above are suitable for some specific applications, but insufficient in some cases. For example, the microparticle disclosed in Japanese Patent Kokai Publication No. 232109/1984 which comprises a shell portion of fluorine containing rubber, when being powdered, exhibits poor flowability and is hence difficult to blend with other resins. In addition, when it is blended with another other resin, the slidability of PTFE in the core portion can not be sufficiently developed due to the presence of the fluorine containing rubber component. When the shell portion is composed of TFE/CTFE copolymer, or ethylene/TFE copolymer (see Japanese Patent Kokoku Publication No. 63584/1988 and Japanese Patent Kokai Publication No. 158651/1990), the fibrillation of PTFE can be prevented and the microparticle is satisfactorily blended with particular resins, but it is unsatisfactory in surface affinity for practical use. The having a shell portion of which is composed of the acrylic resin (Japanese Patent Kokai Publication No. 284201/1988) is unsatisfactory in thermal stability, so that it is unsuitable for blending with high performance resin (engineering plastics).

A coating material comprising polyvinylidene fluoride or CTFE copolymer is commercially available as one comprising fluorine containing polymer which shows excellent weathering resistance and a demand therefor is recently increasing. The addition of PTFE powder or microparticle to various kinds of coating materials including the above mentioned coating material sometimes gives advantageous results, e.g. decrease in marring, increase in stain resistance and flatting. However, since the mutual affinity between PTFE and the resin for coating material is poor, sufficient dispersibility cannot be achieved and the smoothness on the surface of coating film is insufficient.

SUMMARY OF THE INVENTION

It is an object of the present invention to provide a composite microparticle of fluorine containing resins which is suitable for providing other material with the performance and function characteristics of the perfluororesin such as high and low temperature resistance, flame retardance, slidability, nontackiness, stain resistance, chemical resistance, weathering resistance and electrical characteristics, in particular slidability, and which is more excellent in blending properties and dispersibility than the conventional composite microparticles.

The present invention provides a composite microparticle of fluorine containing resins which is obtained by emulsion polymerization, comprising a core portion of a perfluoro resin which comprises 85 to 100% by weight of TFE and 0 to 15% by weight of other fluorine containing olefin monomer copolymerizable with TFE in a monomer composition, is crystalline and has a melting point of not lower than 250° C.; and a shell portion of vinylidene fluoride resin which comprises 30 to 100 mole % of vinylidene fluoride (VdF) and 0 to 70 mole % of other fluorine containing olefin monomer or hexafluoro acetone, copolymerizable with VdF (excluding hexafluoroisobutene), is crystalline and has a melting point of not lower than 70° C., the composite microparticle having a multilayer or gradient structure and an average particle size of 0.05 to 1.0 μm.

DETAILED DESCRIPTION OF THE INVENTION

Examples of the fluorine containing olefins copolymerizable with TFE which are used in the core portion are olefins such as a compound of the general formula:

$$X(CF_2)_mO_nCF=CF_2 \quad (I)$$

wherein X represents hydrogen, chlorine or fluorine; m is an integer of 1 to 6; and n is 0 or 1, a compound of the general formula:

$$C_3F_7O[CF(CF_3)CF_2O]_p\text{-}CF=CF_2 \quad (II)$$

wherein p is 1 or 2, a compound of the general formula:

$$X(CF_2)_qCY=CH_2 \quad (III)$$

wherein X is the same as defined above, Y represents hydrogen or fluorine, and q is an integer of 1 to 6, CTFE, VdF, and trifluoroethylene (3FH). They may be used alone or in admixture. The copolymerizable olefin is contained in the copolymer in such an amount that the copolymer is a crystalline resin having a melting point of not lower than 250° C.

The resin which composes the core portion is a crystalline resin having a low friction coefficient in which most of the carbon atoms are bonded with fluorine atoms (referred to as "perfluororesin" hereinafter). There are preferred PTFE having a TFE content of 98% by weight or more in which the fluorine containing olefin mentioned above (the formulas I, II and III) is copolymerized in a modified amount, e.g 2% by weight or less; a resin in which the fluorine containing olefin of the formula I or II is copolymerized in an amount of 1 to 15% by weight, for example, commercially available PTFE including modified PTFE (melting point: 330±20° C.); PFA in which a perfluoro(alkyl vinyl ether) represented by the general formula: $F(CF_2)_rOCF=CF_2$ in which r is from 1 to 5, or the general formula (II) is copolymerized in a amount of 2 to 5 % by weight (melting point: 310°±20° C.); and FEP in which HFP is copolymerized in an amount of 5 to 15 by weight (melting point: 270±20° C.). Among them, PTFE which has a TFE content of 98 % by weight or more and a melt viscosity of $10^8$ poise or larger at 380° C. (non-melt processable) is most preferred.

The resin which composes the shell portion is the VdF resin having a VdF content of 30 to 100 mole %. Preferred examples of other fluorine containing olefin monomers copolymerizable with VdF are TFE, CTFE, 3FH, vinyl fluoride (VF), pentafluoropropene and the fluorine containing olefin represented by the above formulas (I), (II) or (III) or hexafluoro acetone (HFA).

More specifically, preferred examples of the resin which composes the shell portion are PVdF or VdF copolymer, e.g. copolymer of VdF and TFE, copolymer of VdF and HFP, copolymer of VdF and CTFE, copolymer of VdF and HFA, VdF/TFE/HFP terpolymer, VdF/TFE/CTFE terpolymer, VdF/TFE/perfluoro(alkyl vinyl ether) terpolymer and VdF/TFE/propylene terpolymer, which has such a composition that it is crystalline and has a melting point of not lower than 70° C. The ratio of the fluorine containing olefin other than VdF in the copolymer should be 70 mole % or less for TFE, 15 mole % or less for HFP, 20 mole % or less for CTFE, and 5 mole % or less for perfluoro(alkyl vinyl ether), respectively.

As is well known from the polymer blend of PVdF and polymethyl methacrylate, the VdF resin which composes the shell portion is more excellent in compatibility with general-purpose hydrocarbonic resin or organic solvent affinity (even soluble in many cases) than other fluoroplastics. Therefore, the composite microparticle according to the present invention exhibits an excellent affinity in blending with various kinds of resins and elastomers. Reasonably, the composite microparticle has a particularly excellent blending property with PVdF which is the most general purpose resin as weather resistant coating material and molding material in the fluoroplastics.

Among the resins which compose the shell portion, VdF/TFE copolymer is known as the resin having characteristic features. PTFE is insoluble in usual organic solvents and PVdF is soluble in particular organic solvents such as dimethylacetoamide. However, the VdF/TFE copolymer has far higher solubility than PVdF. For example, the VdF/TFE copolymer having a TFE content of from 5 to 30 mole % is soluble in tetrahydrofuran (THF), methyl ethyl ketone (MEK) and acetone. PTFE and PVdF have a melting point of $330\pm20°$ C. and $170°+10°$ C., respectively, whereas the VdF/TFE copolymer has a minimum melting point of from $120°$ to $130°$ C. at a TFE content of 20 to 35 mole % in the copolymer. When the VdFFFFE copolymer is used as a shell resin, the microparticle can exhibit characteristic blending property and dispersibility, using the solubility of the shell portion in solvent (also the affinity to other materials). The VdF/TFE resin having TFE content of 30 mole % or less is one of the most suitable resins as the shell resin.

VdF/HFP copolymer, VdF/CTFE copolymer, and VdF/TFE/(HFP or CTFE) terpolymer are usually prepared as elastomer in a VdF content of about 20 to 80 mole %, a TFE content of 40 mole % or less, a HFP content of about 10 to 60 mole % and a CTFE content of about 15 to 40 mole %. However, when the copolymer or the terpoymer having such compositions is used as shell resin, the flowability of the powder obtained by aggregating and drying the aqueous dispersion of the composite particle of fluorine containing resins is lowered and hence the powder is difficult to handle. Moreover, the slidability of PTFE is decreased due to the presence of the elastomer component. VdF/HFP copolymer, VdF/CTFE copolymer, and VdF/TFE/(HFP or CTFE) terpolymer having a VdF content of 70 mole % or more, a HFP content of 6 mole % or less and a CTFE content of 15 mole % or less, which has a melting point of not lower than $120°$ C. are excellent in solubility in solvent, and are preferred resins as shell resin in property and preparation like VdF/TFE resin.

The term "crystalline" herein has the with meaning with that a resin has a definite melting point. The melting point can be simply determined as a peak temperature in an endothermic curve in differential scanning calorimetry (DSC).

The ratio of the core portion to the shell portion may be such that the core portion can display the characteristics of the perfluoro resin, and the shell portion has an affinity to other material, and the fibrillation of PTFE can be prevented when the core portion is composed of high molecular weight PTFE. The weight ratio of the core portion to the shell portion is usually from 96:4 to 30:70, preferably 90:10 to 50:50.

The weight ratio mentioned above is a value based on the assumption that distinct two layers exist in the microparticle. However, the core/shell structure in the present invention are not limited to a distinct two layer structure, i.e. a core layer and a shell layer. For example, in the case where the shell portion contains TFE component, e.g. in VdF/TFE copolymer, since TFE which is an essential component in the core portion is common in both layers, it is possible to gradate the VdF concentration by gradually increasing continuously or stepwise the concentration of VdF in the preparation of the microparticle so that a desired composition is made up in the shell portion. Therefore, generally speaking, the microparticle according to the present invention is the one in which the composition is successively gradated, or which has a multilayer structure. It is the requirement of the present invention that the shell portion inside at least 4% by weight, preferably 10% by weight, from the surface of the microparticle is composed of a crystalline resin having a melting point of not lower than $70°$ C. and a VdF content of 30 to 100 mole %.

When the ratio of the perfluororesin in the core portion to the whole composite microparticle exceeds 96% by weight, the affinity to other materials is unsatisfactory and, when the core portion is composed of a high molecular weight PTFE, the resulting fibrillation deteriorates the blending property with the molding resin, elastomer and coating material and the dispersibility therein. On the contrary, when the ratio of the perfluororesin is less than 30% by weight, the soil resistance, the slidability and the marring resistance of the perfluoro resin cannot developed sufficiently although the blending property and the dispersibilty of the microparticle is excellent.

The resin composing the shell portion of the composite microparticle according to the present invention has a low viscosity so as to show melt flowability at a temperature of the melting point or above. Accordingly the microparticle exhibits melt flowability as a whole even when the core portion is composed of a high molecular weight PTFE which does not show melt flowability. On the other hand, the modified PTFE having the core/shell structure described in Japanese Patent Kokai Publication No. 247408/1989 is not of melt processability as a whole. The composite microparticle of fluorine containing resins according to the present invention cannot be paste extruded since it is prevented from fibrillation as the microparticle described in Japanese Patent Kokai Publication No. 247408/1989. If the paste extrusion is attempted, a subsequently molded article cannot be obtained.

The composite microparticle of fluorine containing resins according to the present invention is prepared by Step I, in which 85 to 100% by weight of TFE and 0 to 15% by weight of other fluoroolefin are homo- or copolymerized in the presence of an anionic surfactant having no telogen activity, followed by Step II, in which 30 to 100 mole % of VdF and 0 to 70 mole % of other fluorine containing olefin copolymerizable with VdF are homo- or copolymerized.

The composite particle of fluorine containing resins according to the present invention can be generally prepared by the similar process as described in Japanese Patent Kokoku Publication No. 26242/1981. The weight ratio of the core portion to the shell portion can be determined by the monomer amount consumed or weighing the content of the resin solid in the aqueous dispersion obtained in Step I and Step II, respectively. The content of the resin solid in the aqueous dispersion finally obtained in Step II is usually from 10 to 50% by weight, preferably 20 to 40% by weight.

More specifically, Step I comprises homo- or copolymerizing TFE and optionally another fluorine containing olefin in an aqueous medium containing a water soluble fluorine containing dispersant represented by the general formula:

$C_sF_{2s+1}COOZ$, or $C_3F_7O[CF(CF_3)CF_2O]_tCF(CF_3)COOZ$ wherein s is an integer of 6 to 9, t is 1 or 2, and Z represents $NH_4$ or alkali metal, in an amount of 0.03 to 1% by weight under a reaction pressure of 6 to 40 kgf/cm² at a temperature of about 10 to 100° C., using a water soluble organic or inorganic peroxide such as disuccinic acid peroxide (DSAP) or persulfate alone or in the combination thereof with a reducing agent.

In order to control the molecular weight, it is also possible to use hydrocarbons or halogenated hydrocarbons such as $CH_4$, $CH_3Cl$, $CH_2CCl_2$, etc, alcohols such as methanol, ethanol, etc, ketones, or esters as a chain transfer agent.

Step II can be carried out by replacing the monomer used in Step 1 with other monomer or changing the monomer composition, and optionally adding the initiator to continue the reaction after Step 1; or by so-called seed polymerization in which a portion or the whole of the aqueous colloidal PTFE particle dispersion obtained in Step I is transferred to a separate reactor, a water soluble fluorine containing dispersant and/or an initiator are added, and the monomer to constitute shell portion is charged to proceed reaction.

The initiator to be used in Step II may be the same as that in Step I or a different water soluble organic or inorganic initiator. If desired, an oil-soluble initiator can also be used. The reaction pressure in Step II may be set higher than in Step I in order to increase a reaction rate, and is about 6 to 60 kgf/cm². The reaction temperature in Step II is not necessarily the same as in Step I. A temperature suitable for controlling the composition and the physical properties of the copolymer composing the shell portion can be selected in the range of about 10° to 120° C.

When VdF is used alone in the reaction in Step II, the reaction pressure is from about 15 to about 60 kgf/cm², preferably from 20 to 45 kgf/cm². Any reaction temperature can be selected taking into account of the decomposition rate of the initiator which is the main radical source in Step II. When usual persulfate is used as an initiator, it is preferably from 60° to 100° C.

It is also preferred to add a water insoluble and substantially inert liquid hydrocarbon or halogenated hydrocarbon as a dispersion stabilizing agent for colloidal particles in either or both of Step I and II reaction.

The average size of the composite particle of fluorine containing resins according to the present invention is usually from 0.05 to 1 μm, preferably from 0.1 to 0.5 μm. The particle size controlling method used in general emulsion polymerization can be applied for controlling the size of the composite microparticle according to the present invention. The size of the microparticle has an effect on the viscosity when aqueous or non-aqueous coating material is prepared therefrom.

The composite microparticle of fluorine containing resins according to the present invention can be obtained in the form of an aqueous dispersion. However, it can be transformed in the form of powder by conventional methods (see US Pat. No. 259358), for example, aggregating the colloidal fluorine containing resin microparticle in the aqueous dispersion with an inorganic acid or alkali, a water soluble inorganic salt, an organic solvent, etc. and drying it at a temperature below the melting point of the copolymer of the shell portion. The powder obtained is finer and also more excellent in flowability than that obtained by aggregating and drying the aqueous dispersion by the emulsion polymerization of TFE. Moreover, when the powder according to the present invention is dispersed in an aqueous solution of a surfactant or an organic solvent which can wet it sufficiently, it can be re-dispersed, occasionally to a colloidal particle level, by means of mechanical stirring, ultrasonic, or the like.

When the powder is dispersed in an organic solvent, an organosol can be obtained. It is also possible to prepare an organosol by phase reversal method as described in Japanese Patent Kokoku Publication No. 17016/1974.

The powder prepared from the composite microparticle of fluorine containing resins can be used as the modifying agent for increasing flame retardance, nontackiness, slidability, marring resistance, water and oil repellency, electrical characteristics, stain resistance, corrosion resistance and weathering resistance, and as a white pigment by blending it with thermoplastic resins, thermosetting resins, or rubbers. For example, it exhibits more excellent blending property and surface affinity than the conventional perfluororesin powders or pellets as the modifying agent of engineering plastics, e.g. polyacetal, polycarbonate, polyether ether ketone, wholly aromatic polyester, polyethylene terephtalate, polyphenylene sulfide, polyamide, polyphenylene oxide, polybutylene terephthalate, polyether sulfone, and polysulfone, polyimid, or as the white pigment in colorless and transparent resins such as acrylic resins or styrenic resins.

It reasonably exhibits excellent blending property with hydrogen containing fluororesins or fluororubbers, for example, PVdF, VdF/TFE copolymer, VdF/CTFE copolymer, VdF/HFP copolymer, VdF/TFE/HFP copolymer, ethylene/TFE copolymeric resin, ethylene/CTFE copolymeric resin. The blending property with the PVdF (co)polymer resin or elastomer is most excellent. The excellent blending property results from the high affinity of the surface of the composite microparticle to such polymers and the inhibition of fibrillation.

When the thermoplastic resin or thermosetting resin is provided with slidability, high content blending of the powder prepared from the microparticle according to the present invention is possible since it has better blending property than the low molecular weight PTFE powder usually used. When it is blended in a high content, the flexibility of the perfluororesin in the core portion of the composite microparticle according to the present invention enhances a sealing property, thus providing a material for sliding having good sealing property. For this purpose, the content of the microparticle according to the present invention in a blend can be selected in a wide range of 5 to 90% by weight.

For flame retardance purpose, it is effective to blend the microparticle according to the present invention in an amount of 0.01 to 2% by weight. Preferably the microparticle of which the core portion is composed of PTFE having a viscosity of $10^8$ poise or more at a temperature of 380° C. is blended in an amount of 0.1 to 1% by weight in the blend. For providing the flame retardancy, a high molecular weight PTFE powder is usually blended together with a conventional flame retardant, accelerating the fibrillation, whereby preventing dripping during combustion. However, in many cases, a resulting excessive fibrillation leads to the poor dispersibility of PTFE, hence giving a molded product of poor appearance. On the other hand, although the microparticle according to the present invention hardly causes fibrillation, it is effective for preventing dripping. The object materials suitable for providing the flame retardancy include resins usually used for an appliance, an office appliance, a camera and an automobile, for example, polycarbonate, polyphenylene oxide, styrenic resin, olefin resin, etc.

When a film forming material is added to the organosol dispersed in an organic solvent described above, the mixture can be used as a nonaqueous coating material. An aqueous coating material is also prepared from the aqueous dispersion by adding dispersion stabilizing agent, pigment or a microparticle or powder of other resin including PVdF resin thereto.

Examples of the film forming materials in the nonaqueous coating material are nitrocellulose, cellulose acetate butyrate, alkyd resin, polyester, polyurethane, phenol/formaldehyde resin, urea/formaldehyde resin, melamine/formaldehyde resin, epoxy resin, polyimide, polyamide, polyamideimide, polyethersulfone, polyphenylene sulfide, silicone resin, etc. Among them, polyimide, polyamide, polyamide-imide, polyethersulfon, polyphenylene sulfide, etc. are particularly preferred from the view point of coat strength.

EXAMPLES

The present invention will be illustrated by Examples and Comparative Examples more specifically. The following methods for measurements or tests were used in Examples and Comparative Examples.

DSC Measurement:

DSC measurement is carried out by raising the temperature of a sample from 25° C. to 370° C. at a rate of 10° C./minute using a differential scanning calorimeter ("DSC7 type" available from Perkin Elmer) and recording a melting endothermic curve, from which a peak temperature is adopted as melting point. Melt Viscosity:

Melt viscosity is measured using a flow tester ("CFT type" available from Shimadzu Corporation). An amount of polymer powder is charged in a cylinder having an inner diameter of 11.3 mm and kept at a temperature of 380° C. for 5 minutes. Then a load of 50 kg is applied to a piston to extrude the polymer through an orifice having an inner diameter (2R) of 0.21 cm and a length (L) of 0.8 cm to measure a run-off volume (Q: $cm^3$/sec).

Melt viscosity is calculated from the following equation:

Melt Viscosity (poise)=$\Delta P \cdot R^2 / 8 \cdot L \cdot Q$ wherein $\Delta P$ is a load (dyne).

Paste Extruding Test:

Fifty grams of a fine powder are mixed with 10.8 g of an extruding auxiliary of a hydrocarbon oil (commercially available from Idemitsu Oil Chemistry under the trade name of IP1620) in a glass bottle. The mixture is matured at a room temperature (25°±2° C.) for 1 hour. Then the mixture is charged in a die (having an orifice of 2.54 mm in inner diameter and 7 mm in land length which has a throttling angle of 30° at a lower end) having a cylinder of 25.4 mm in inner diameter, and a load of 60 kg is applied to the piston inserted in the cylinder and kept for 1 minute.

Thereafter the mixture is extruded at a ram speed (a pushing-down speed of the piston) of 20 mm/minute. Extrusion pressure (kgf/$cm^2$) is the pressure at the time when it reaches an equilibrium in the latter half of the extrusion divided by the sectional area of the cylinder.

Thrust Friction-Abrasion Test:

A thrust friction-abrasion test is carried out using S45C (surface roughness Ra=0.1–0.2 μm) as a partner material in Suzuki Matsubara friction abrasion tester. A dynamic coefficient of friction and specific abrasion wear are calculated by the following equations:

Dynamic Coefficient of Friction = friction force (kgf)/[face pressure (kgf/$cm^2$) × contact area ($cm^2$)]

Specific Abrasion Wear ($mm^3$/kgf · km) = abrasion weight (mg)/ [travel length (km) × face pressure (kgf/$cm^2$) × contact area ($cm^2$) × density (mg/$mm^3$)]

Tensile Test:

Tensile strength at break and tensile elongation at break are measured at a room temperature at a rate of pulling of 10 mm/min using a Tenslion universal tester (available from Orientec) according to ASTM D638.

EXAMPLE 1

Into a 6 l stainless steel (SUS 316) autoclave equipped with a stainless steel anchor agitator and a temperature controlling jacket, 2960 ml of deionized water and 3.0 g of ammonium perfluorooctanate were charged. After purging three times with nitrogen gas and twice with TFE gas while heating to remove oxygen, TFE was injected to an internal pressure of 9.0 kgf/$cm^2$ and the internal temperature was kept at 70° C. with stirring at 250 rpm Then 60 ml of hexafuoropropene (HFP) gas was added with a syringe, and the aqueous solution of 150 mg (50 ppm of the total water used) of ammonium persulfate (APS) in 20 ml of water was injected with TFE to an internal pressure of the autoclave of 90 kgf/$cm^2$ . The reaction proceeded with increasing speed, but the reaction temperature was kept at 70° C. and stirring at 250 rpm. TFE was successively fed so as to keep the deviation of the internal pressure of ±0.5 kgf/$cm^2$.

When TFE consumed in the reaction reached 578 g (after 3.4 hours from the addition of the initiator), the stirring and the TFE feeding were stopped. TFE was discharged to such an extent that the internal pressure became 1.5 kgf/$cm^2$ and a portion of the aqueous dispersion (10 ml) was sampled out at the same time (Step I was completed at this time and Step II was started hereafter). Then a TFE/VdF gas mixture having a VdF content of 81 mole % was fed to a pressure of 9.0 kgf/$cm^2$ through a separate line. Stirring was resumed and the reaction was continued while keeping the above internal pressure. When 127 g of the gas mixture was substantially consumed, the stirring and the feeding of the gas mixture were stopped and the gas remaining in the autoclave was discharged to an atmospheric pressure to terminate the reaction. The VdF concentration in the autoclave was 70 to 80 mole % during the polymerization. The total reaction time was 8.6 hours.

The resulting aqueous dispersion of the composite microparticle of fluorine containing resins was analyzed with a laser light scattering particle size analysis system ("LPA-3000" available from Otsuka Electronic). The number average particle size was 0.14 μm. The same method was used in the following Examples and the Comparative Examples.

The solid content in the aqueous dispersion obtained by evaporation to dryness was 20.3 % by weight. The weight ratio of a core portion to a shell portion was calculated from the amounts of the monomer consumed to be 578:127, i.e. 82:18.

Thermogravimetric analysis was effected using a portion of the resin after being evaporated to dryness. Two-stage pyrolysis behavior was observed, which substantially corresponded with the weight ratio of the core portion to the shell portion calculated from the monomer amounts consumed.

An elemental analysis of the composite polymer obtained showed the carbon content of 25.70% by weight. The average monomer composition of the shell resin was calculated to be 77 mole % of VdF and 23 mole % of TFE from the carbon content and the core/shell weight ratio. The core portion was regarded as TFE homopolymer (PTFE).

A portion of the obtained aqueous dispersion which had been transferred into a vessel equipped with a high speed stirrer was aggregated by the addition of ammonium carbonate while stirring at a room temperature, followed by dehydrating, washing and drying the aggregate at 50° C. under a reduced pressure. The dried powder obtained was excellent in flowability.

The IR spectrum measurement (according to the method described in Japanese Patent Kokoku Publication No.4643/1962) of PTFE obtained by the evaporation to dryness of the aqueous dispersion sampled in Step I showed a HFP content of 0.005% by weight. The melt viscosity at this time is able to be regarded as being the same as in Comparative Example 1 described hereinafter.

DSC measurements were effected using each 3.00 mg of the dried powder and PTFE of Step I. The dried powder showed two melting points of 121° C. and 328° C. which corresponded to the peak temperatures in the DSC curve, while PTFE showed a melting point which corresponded to the high temperature-side peak in the dried powder.

Paste extrusion was attempted using the dried powder. However, the extrudate was discontinuous and had no strength due to fibrillation. The extrusion pressure at equilibrium was 50 kgf/cm$^2$. The powder showed a melt viscosity of $1.83 \times 10^6$ poise.

Blending Property with PVdF

One hundred and sixty grams of PVdF resin ("VP-800", commercially available from Daikin Industries) pellet were mixed with 40 g of the above dried powder in a Henschel mixer ("Laboplastmill" available from Toyo Seiki Seisakusho). The mixture was extruded at a temperature of 220° C. in a twin screw extruder to obtain pellets, The same procedure was repeated except that the powder prepared according to Example I of Japanese Patent Kokai Publication No. 158651/1990 was used in place of the above dried powder to obtain pellets. The increases in torque which were observed in both samples were in such an extent that kneading and extruding were possible.

Sheets of each 1.0 mm in thickness were prepared by heat-pressing the pellets of the above dried powder and the powder prepared according to Example I of Japanese Patent Kokai Publication No. 158651/1990, respectively.

Figure 1:
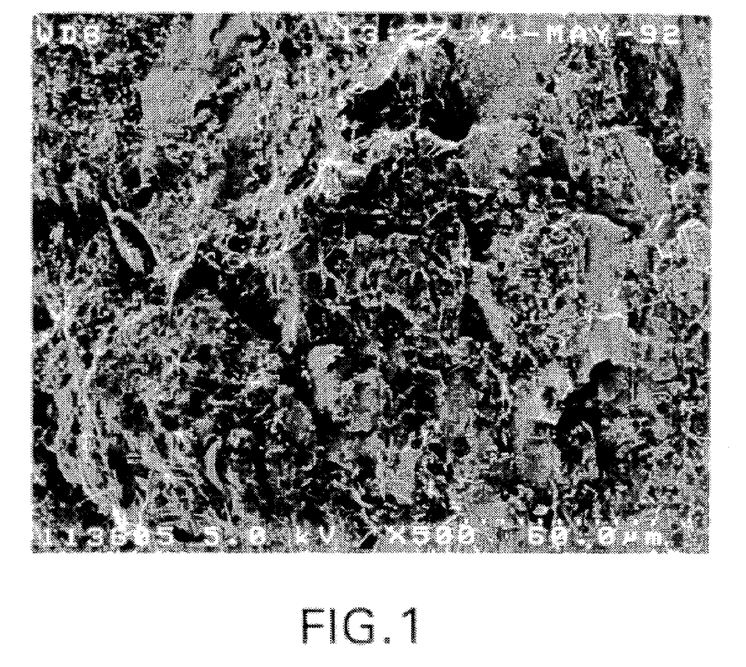
FIG. 1 is a SEM photograph showing a particle structure of a frozen and ruptured cross section of the pressed sheet prepared from the blend of the powder (20% by weight) in Example 1 according to the present invention and PVdF resin.
Figure 2:
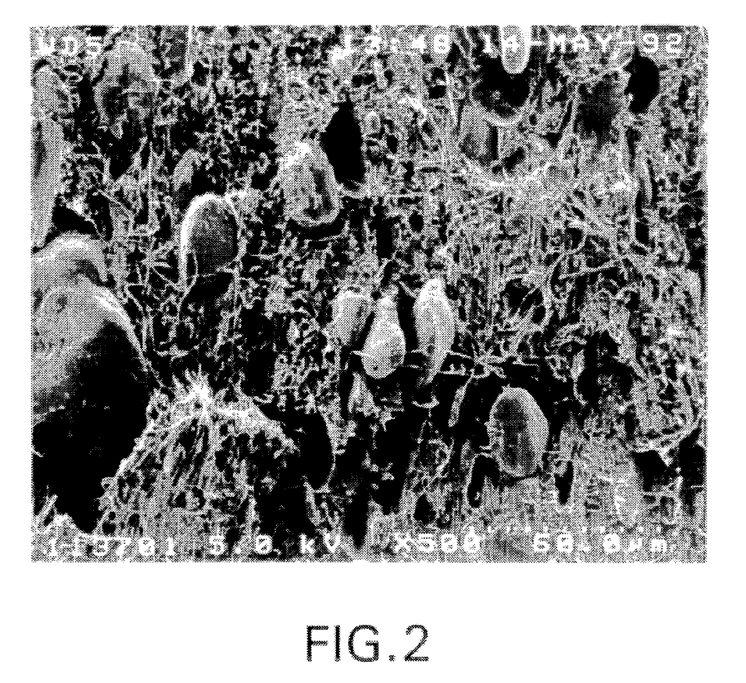
FIG. 2 is a SEM photograph showing a particle structure of a frozen and ruptured cross section of the pressed sheet prepared from the blend of the powder (20% by weight) described in Example 1 of Japanese Patent Kokai Publication No. 158651/1990 and PVdF resin.

A part of each sheet was freeze-broken with liquid nitrogen and the cross section thereof was observed by means of a scanning-type electron microscopy. The blend of the above dried powder with PVdF resin (FIG. 1) did not showed the separation from the PVdF matrix resin while the separation was observed for the blend of the powder prepared according to Example I of Japanese Patent Kokai Publication No. 158651/1990 with PVdF resin (FIG. 2). This shows the good affinity of the composite microparticle according to the present invention to PVdF surface. In the Figures a granular portion is an aggregate of the composite microparticle.

Dispersibility in Solvent

The above dried powder was evaluated for dispersibility. It was easily redispersed in toluene, ethanol and an aqueous solution of a 5% nonionic surfactant (Triton X-100) by ultrasonic mixing.

Preparation of Organosol by Phase Reversal Method and Nonaqueous Coating Material and Evaluation of Coating According to the method described in Japanese Patent Kokoku Publication No. 63584/1988, to 100 parts by weight of the solid contained in the aqueous dispersion in Example 1, 125 parts by weight of n-hexane (phase reversing liquid) were added. Then 275 pans by weight of acetone (phase reversing agent) were added while stirring the mixture. After stirring for five minutes, the mixture was allowed to stand and the supernatant was discarded. Three hundred parts by weight of methyl isobutyl ketone were added to the remaining precipitate. The mixture was heated to about 100° C. with stirring to remove the water and the excessive organic medium remained in the precipitate to such an extent that a solid content became 30% by weight to obtain an organosol. The water content in the organosol as determined by Karl-Fisher method was about 0.2%.

To 100 parts by weight of the above organosol, there were added 110 parts by weight of polyamideimide polymer ("HI-610" commercially available from Hitachi Chemical.), 2 parts by weight of carbon ("Carbon Neospectra Mark IV" commercially available from Columbia Carbon), and 91 parts by weight of N-methyl-2-pyrrolidone. The mixture was mixed at 20° C. for 48 hours in a ball mill rotating at 80 rpm.

The mixture was sprayed on a degreased aluminum plate at a spraying pressure of 3 kgf/cm$^2$ using a spray gun having a nozzle of 0.8 mm in diameter. Then the aluminum plate was dried at 80° C. for 30 minutes in a infrared drying oven, followed by the calcination at 230° C. for 30 minutes in an electric oven, to prepare a specimen having a coating.

The thickness of the coating obtained was 40 to 50 mμ as determined by a ultrasonic thickness indicator ("Type ESSe3KB4" available from Ketto Science Institute).

The weight loss of the coating after 1000 revolutions was measured to be 7.0 mg using a Teber type abrasion tester (abrasion(?) No. CS17, a load: 1 kg, revolutions: 1000)

The friction coefficients of the coating before and after the abrasion test were measured to be 0.07 and 0.06, respectively, using a Bauden-Leven type friction coefficient instrument (8 mm steel ball, a load: 1 kg, a rate: 0.23 cm/sec).

When the aqueous dispersion obtained in Comparative Example 1 or 2 was used, the aggregate obtained by adding acetone as a phase reversing agent could not be dispersed by subsequent procedures to obtain an organosol.

EXAMPLE 2

Into a 2 I stainless steel autoclave equipped with an anchor agitator, two baffle plates and a thermometer holder, there were charged 0.791 of deionized water, 30 g of liquid paraffin of reagent grade and 0.3 g of ammonium peffluorooctanate. The gas within the system was purged 3 times with nitrogen gas and two times with TFE while keeping the mixture at 70° C.

Into the autoclave, 0.1 g of HFP gas was added with a syringe, followed by the injection of TFE to a pressure of 9.0 kgf/cm$^2$. The aqueous solution of 80 mg of APS in 10 ml of water was added to the mixture while stirring to initiate polymerization. During the polymerization, the rate of stirring and the reaction temperature were kept at 500 rpm and 70° C., respectively, and TFE was continuously fed into the system so that the pressure in the autoclave was always kept at 9.0 kgf/cm$^2$. When 170 g of TFE was consumed (after 3.5 hours), the stirring and the feeding of TFE were stopped and TFE was discharged to a pressure of 1.0 kgf/cm$^2$ (Step 1 was completed at this time and Step II was started hereafter). Then TFE/VdF gas mixture having a VdF content of 53 mole % was fed through a separate line to a pressure of 9.0 kgf/cm$^2$. Stirring was resumed and the reaction was continued while keeping the above pressure. When 52 g of the gas mixture was consumed, the stirring and the feeding of the gas mixture were stopped and the gas remaining in the autoclave was discharged to terminate the reaction The VdF concentration in the autoclave was 42 to 35 mole % during the polymerization.

The number average diameter of the microparticle obtained was 0.19 μm and the solid content in the aqueous dispersion was 21.5% by weight. The weight ratio of the core portion to the shell portion was calculated from the amounts of the monomers consumed to be 77:23.

The elemental analysis of the composite polymer obtained showed the carbon content of 24.96% by weight. The average monomer composition of the shell resin was calculated to be 40 mole % of VdF and 60 mole % of TFE.

A powder was prepared in the same manner as in Example 1 to obtain the one which was excellent in flowability. DSC measurement showed two melting points of 207° C. and 330° C.

Blending Property with PVdF

One hundred and sixty grams of PVdF resin ("VP-800" commercially available from Daikin Industries) pellet were mixed with 40 g of the above dried powder in a Henscel mixer. The mixture was extruded at a temperature of 220° C. in a twin screw extruder ("Laboplastomill" commercially available from Toyo Seiki Seisakusho) to obtain pellets. The same procedure was repeated except that the powder prepared according to Example 1 of Japanese Patent Kokai Publication No. 158651/1990 was used in place of the above dried powder. The increases in torque were observed in both cases, which was however in such a extent that kneading and extruding were possible.

Sheets of each 1.0 mm in thickness were prepared by heat-pressing the pellet from the above dried powder, the pellet from the powder according to Example I of Japanese Patent Kokai Publication No. 158651/1990, and PVdF pellet, respectively, at 220° C. White sheets were obtained from the powders containing pellets and a transparent sheet from the PVdf resin pellet. A tensile test was effected at a room temperature using the sheets obtained. Dynamic friction coefficient and specific abrasion wear were measured for the sheet which had been polished by a sand paper (No. 2000) according to Slast-type friction-abrasion test (a face pressure: 4kgf/cm² a rate: 60 m/min). As shown in Table 1, the above dried powder can suppress the lowering of mechanical characteristics, and improve slidability characteristics effectively in comparison with the sheet from the powder prepared according to Example 1 of Japanese Patent Kokai Publication No. 158651/1990.

TABLE 1

|  | Tensile Strength at Break (kgf/cm²) | Tensile Elongation at Break (%) | Dynamic Friction Co-efficient | Specific Abrasion Wear (mm³/ kgf km) |
|---|---|---|---|---|
| Blend with Powder of Example 2 | 450 | 45 | 0.20 | 0.01 |
| Blend with Powder of Example 1 in JP-A-158651/ 1990 | 320 | 25 | 0.21 | 0.03 |
| PVdF Resin (VP-800) | 590 | 310 | 0.8 | 0.05 |

Blending Property with Totally Aromatic Polyester 2400 g of a totally aromatic polyester ("Vectra A950" commercially available from Polyplastics) and 600 g of the above dried powder were mixed and melt kneaded at 300° C., using a twin screw extruder ("Laboplastomill" commercially available from Toyo Seiki Seisakusho) to obtain a pellet for molding. The pellet was injection molded with an injection molding machine at a cylinder temperature of 290° C. and a mold temperature of 80° C. to obtain specimens. Slast-type Friction-Abrasion test (a face pressure: 3kgf/cm² a rate:15 m/min.) showed a friction coefficient of 0 21 and a specific abrasion wear of 0.007 (mm³/kgf·km).

On the other hand, for the specimen from a low molecular weight PTFE ("L-169J" commercially available from Asahi Floropolymer), friction coefficient was 0.24 while specific abrasion wear was as much as 0.04.

Dispersibility in Solvent

The above dried powder was easily ultrasonically redispersed in toluene, ethanol and an aqueous solution of a 5 % nonionic surfactant (Triton X-100).

EXAMPLE 3

A reaction was carried out in the similar manner to that in Example 2. When 170 g of TFE was consumed (after 3.5 hours from the start of the reaction), TFE was discharged from the reaction system. Then the gas mixture having a composition of VdF/TFE/CTFE of 82/13/5 in mole % was fed through a separate line to the pressure mentioned above, and stirring was resumed. The polymerization was continued while keeping the pressure constant. When 54 g of the gas mixture was consumed, the stirring was stopped and the gas remaining in the autoclave was discharged to terminate the reaction.

The number average diameter of the microparticle in the aqueous dispersion obtained was 0.16 μm and the solid content therein was 21.9% by weight. The weight ratio of the core portion to the shell portion was calculated from the amounts of the monomers consumed to be 76:24. The average monomer composition of the resin of step II was calculated from the carbon content by elemental analysis and the chlorine content by radio-activation analysis of the composite resin obtained to be VdF/TFE/CTFE of 76/13/11 in mole %.

A powder was prepared in the same manner as in Example 1 to obtain the one which was excellent in flowability. DSC measurement showed two melting points of 79° C. and 329° C.

Dispersibility in Solvent

The above dried powder was easily ultrasonically redispersed in toluene, ethanol and an aqueous solution of a 5 % nonionic surfactant (Triton X-100).

Comparative Example 1

In Example 1, Step I was carried out until 220 g of TFE was consumed, but Step II was not effected. The powder prepared by the similar manner to that in Example 1 showed very poor flowability. Therefore, the powder could not be stationarily fed through a hopper when being mixed with another resin. The melt viscosity of the powder was too high to be determined with a flow tester. It was $2 \times 10^{11}$ poise as determined by the method described in Japanese Patent Kokai Publication No. 1711/1989.

The dried powder were paste extruded to obtain a extrudate which was continuous and homogeneous. The extrusion pressure at equilibrium was 92 kgf/cm². The blending property of the dried powder obtained with PVdF was attempted to be evaluated under the same condition as in Example 1. The torque in kneading and extruding was extraordinarily increased due to the fibrillation of PTFE. The dispesibility in solvent (see Example 1) was also very poor.

Comparative Example 2

Example 2 was repeated except that the reaction of Step II was stopped when 7.0 g of the gas mixture was consumed.

The number average diameter of the microparticle in the aqueous dispersion was 0.14 μm and the solid content therein was 18.1% by weight. The weight ratio of a core portion to a shell portion was calculated from the amounts of the monomers consumed to be 97:3.

It was impossible to calculate the average monomer composition of the resin of Step II from the carbon content determined by elementary analysis since the error thereof was too large. However it would be regarded as being the same as in Example 2. DSC measurement showed a melting point of 230° C. which corresponded to that of the resin of Step I. However the melting point of 207° C. observed in Example 2 was not clear due to a small amount of the resin of Step II.

The powder obtained had better flowability than that of Comparative Example 1, but was not enough to be able to be stationarily fed through a hopper. The blending property with PVdF was such that torque increased and hence practical use was impossible as in Comparative Example 1. The dispersibility in solvent was far inferior to Examples 1–3.

The composite microparticle of fluorine containing resins according to the present invention is excellent in blending property with resins or elastomers and dispersibility in coating materials, and has a high affinity to an object material for blending or dispersing, therefore resulting in minimizing the lowering of the physical property of the composite material which is obtained by the blending or the dispersing thereof. In addition, the microparticle according to the present invention can provide an object material with the characteristic features of perfluororesins, such as slidability.

What is claimed is

1. A composite microparticle of fluorine containing resins which is obtained by emulsion polymerization, comprising a core of a perfluoro resin which comprises 85 to 100% by weight of tetrafluoroethylene and 0 to 15% by weight of other fluorine containing olefin monomer copolymerizable with tetrafluoroethylene in a monomer composition, is crystalline and has a melting point of not lower than 250° C.; and a non-elastomeric shell of vinylidene fluoride resin which comprises 30 to 100 mole % of vinylidene fluoride and 0 to 70 mole % of a fluorine containing olefin monomer copolymerizable with vinylidene fluoride, excluding hexafluoroisobutene, or hexafluoro acetone, is crystalline and has a melting point of not lower than 70° C.; the composite particle having a multi-layer or gradient concentration structure of vinylidene fluoride in the shell and an average particle size of 0.05 to 1.0 μm.

2. A composite microparticle of fluorine containing resins as claimed in claim 1 wherein the resin composing the core portion is polytetrafluoroethylene having no melt processability.

3. A composite microparticle of fluorine containing resins as claimed in claim 1 wherein the resin composing the shell portion comprises 70 to 100 mole % of vinylidene fluoride and 0 to 30 mole % of at least one fluorine containing olefin selected from the group consisting of tetrafluoroethylene, chlorotrifluoroethylene and hexafluoropropene, and the resin has a melting point of not lower than 120° C.

4. A composite microparticle of fluorine containing resins as claimed in claim 1 or 2 wherein the weight ratio of the core portion to the shell portion is 96:4 to 30:70.

5. The composite microparticle according to claim 1, wherein said core portion comprises 98% by weight or more of tetrafluoroethylene.

6. The composite microparticle according to claim 1, wherein the fluorine-containing olefin monomer copolymerizable with tetrafluoroethylene in said core portion is at least one selected from the group consisting of chlorotrifluoroethylene, vinylidene fluoride, trifluoroethylene, and compounds of the following formulae:

$$X(CF_2)_mO_nCF=CF_2 \quad (I)$$

wherein X represents hydrogen, chlorine or fluorine, m is an integer of 1 to 6 and n is 0 or 1;

$$C_3F_7O[CF(CF_3)CF_2O]_p\text{-}CF=CF_2 \quad (II)$$

wherein p is 1 or 2; or $$X(CF_2)_qCY=CH_2 \quad (III)$$

wherein X is the same as defined above, Y represents hydrogen or fluorine and q is an integer of 1 to 6.

7. The composite microparticle according to claim 6, wherein said core portion comprises a fluorine-containing olefin of formula (I) or (II), copolymerized in an amount of 1 to 15% by weight with said tetrafluoroethylene.

8. The composite microparticle according to claim 7, wherein said core portion comprises a perfluoro(alkyl vinyl ether) of the formula $$F(CF_2)_rOCF=CF_2$$

wherein r is an integer from 1 to 5.

9. The composite microparticle according to claim 7, wherein said fluorine-containing olefin of formula (II) is copolymerized in an amount of 2 to 5% by weight.

10. The composite microparticle according to claim 7, wherein said fluorine-containing olefin is hexafluoropropylene, copolymerized in an amount of 5 to 15% by weight.

11. The composite microparticle according to claim 1, wherein said shell portion comprises at least one fluorine-containing olefin monomer selected from the group consisting of vinylidene fluoride, tetrafluoroethylene, chlorotrifluoroethylene, trifluoroethylene, vinyl fluoride, pentafluoropropene and compounds represented by the following formulae:

$$X(CF_2)_mO_nCF=CF_2 \quad (I)$$

wherein X represents hydrogen, chlorine or fluorine, m is an integer of 1 to 6 and n is 0 or 1;

$$C_3F_7O[CF(CF_3)CF_2O]_p\text{-}CF=CF_2 \quad (II)$$

wherein p is 1 or 2; or $$X(CF_2)_qCY=CH_2 \quad (III)$$

wherein X is the same as defined above, Y represents hydrogen or fluorine and q is an integer of 1 to 6, or hexafluoro acetone.

12. The composite microparticle according to claim 11, wherein said shell portion comprises a copolymer of vinylidene fluoride and tetrafluoroethylene.

13. The composite microparticle according to claim 11, wherein said shell portion comprises a copolymer of vinylidene fluoride and hexafluoropropylene.

14. The composite microparticle according to claim 11, wherein said shell portion comprises a copolymer of vinylidene fluoride and chlorotrifluoroethylene.

15. The composite microparticle according to claim 11, wherein said shell portion comprises a copolymer of vinylidene fluoride and hexafluoro acetone.

16. The composite microparticle according to claim 11, wherein said shell portion comprises a terpolymer of vinylidene fluoride, tetrafluoroethylene and hexafluoropropylene.

17. The composite microparticle according to claim 11, wherein said shell portion comprises a terpolymer of vinylidene fluoride, tetrafluoroethylene and chlorotrifluoroethylene.

18. The composite microparticle according to claim 11, wherein said shell portion comprises a terpolymer of vinylidene fluoride, tetrafluoroethylene and perfluoro(alkyl vinyl ether).

19. The composite microparticle according to claim 11, wherein said shell portion comprises a terpolymer of vinylidene fluoride, tetrafluoroethylene and propylene.

20. The composite microparticle according to claim 1, wherein said shell portion is polyvinylidene fluoride resin.

21. The composite microparticle according to claim 1, wherein said core portion is a perfluoro resin comprising 98% by weight or more of tetrafluoroethylene, and said shell portion is polyvinylidene fluoride.

22. The composite microparticle according to claim 1, wherein said core portion is a perfluoro resin comprising 98% by weight or more of tetrafluoroethylene, and said shell portion is a copolymer of vinylidene fluoride and tetrafluoroethylene.

23. The composite microparticle according to claim 1, which has a multi-layer structure.

24. The composite microparticle according to claim 1, which has a gradient concentration structure.

25. A composite microparticle of fluorine containing resins which is obtained by emulsion polymerization, comprising a core of a perfluoro resin which comprises 85 to 100% by weight of tetrafluoroethylene and 0 to 15% by weight of other fluorine containing olefin monomer copolymerizable with tetrafluoroethylene in a monomer composition, is crystalline and has a melting point of not lower than 250° C.; and a non-elastomeric shell of vinylidene fluoride resin which comprises 30 to 100 mole % of vinylidene fluoride and 0 to 70 mole % of hexafluoro acetone, is crystalline and has a melting point of not lower than 70° C.; the composite particle having a multi-layer or gradient concentration structure of vinylidene fluoride in the shell and an average particle size of 0.05 to 1.0 μm.

* * * * *